B. H. WHIPPLE.
ATTACHMENT FOR DISK FURROW CULTIVATORS.
APPLICATION FILED AUG. 18, 1913.
1,094,504.
Patented Apr. 28, 1914.
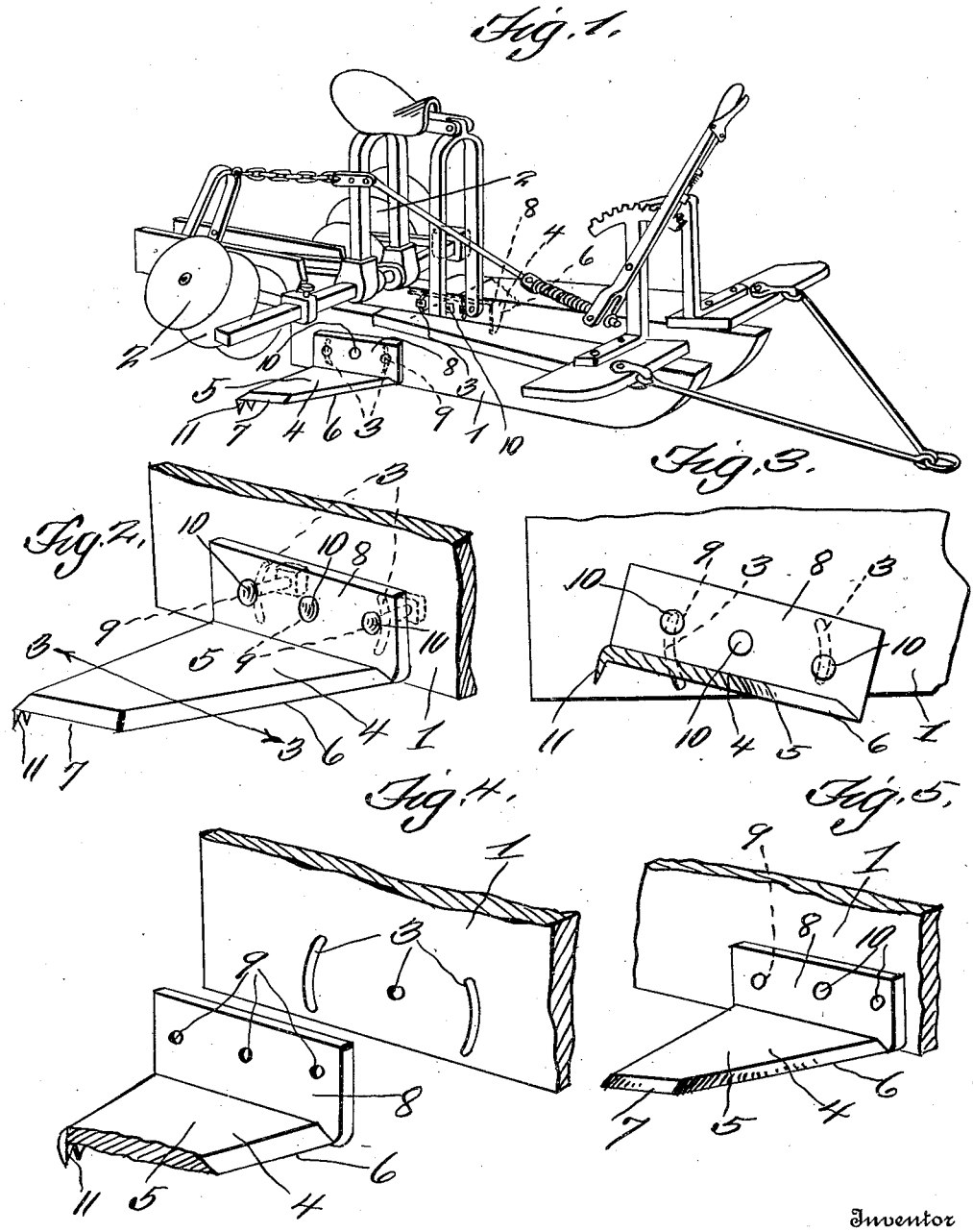
Witnesses
Mark De Grange.
Inventor
B. H. Whipple,
By D. Swift & Co.,
his Attorneys.

UNITED STATES PATENT OFFICE.

BENJAMIN H. WHIPPLE, OF FOREST CITY, MISSOURI.

ATTACHMENT FOR DISK FURROW-CULTIVATORS.

1,094,504. Specification of Letters Patent. Patented Apr. 28, 1914.

Application filed August 18, 1913. Serial No. 785,413.

*To all whom it may concern:*

Be it known that I, BENJAMIN H. WHIPPLE, a citizen of the United States, residing at Forest City, in the county of Holt and State of Missouri, have invented a new and useful Attachment for Disk Furrow-Cultivators; and I do hereby declare the following to be a full, clear, and exact description of the invention, such as will enable others skilled in the art to which it appertains to make and use the same.

This invention relates to disk furrow cultivators, and particularly to new and useful side knives adapted for attachment to the outer sides of the runners of the cultivator. Heretofore, all such knives, owing to their construction and arrangement only knock over or bend the weeds, which spring up adjacent the hills of corn, and furthermore, do not thoroughly break the clods.

Therefore, the present invention aims to overcome such disadvantages, and to this end, the knives are so constructed and mounted so as to be adjusted, in order to uproot or cut the weeds, as well as thoroughly breaking the clods, which breaking of the clods is accomplished, owing to the knives being disposed at an obtuse angle to the plane of the disks of the cultivator. By the adjustment of the knives, the same may be directed farther downwardly, or so as to travel substantially upon the surface of the soil.

In practical fields the details of construction may necessitate alterations, to which the patentee is entitled, provided the alterations fall within the scope of what is claimed.

The invention comprises further features and combination of parts, as hereinafter set forth, shown in the drawings and claimed.

In the drawings:—Figure 1 is a view of a disk furrow cultivator showing the improved side knives as applied. Fig. 2 is an enlarged perspective view of one of the knives showing the same as adjustably connected to one of the runners. Fig. 3 is a sectional view on line 3—3 of Fig. 2, showing the knife adjusted in a different position. Fig. 4 is a view showing one of the knives, and a portion of one of the runners, showing the knife as having been detached. Fig. 5 is a view of one of the knives, showing the adjustability of the same omitted.

Referring more particularly to the drawings 1 designates the runners of the usual form of a disk furrow cultivator, while 2 denotes the disks, which are connected to the runners in the usual manner.

Each runner is provided with a series of bolt holes 3, say for instance, three in number. However, the end holes are slightly elongated, while the center hole is circular. The knives 4 comprise a broad blade 5 having a forward diagonally arranged cutting edge 6, which acts to shear or cut the weeds, as well as cutting into the soil and cutting the clods. The outer portion of the blade is likewise provided with a cutting edge 7, which is arranged at an obtuse angle to the cutting edge 6, and at an acute angle to the rear edge or heel of the blade. This latter cutting edge 7 likewise acts to shear the weeds as well as cutting the soil and the clods thereof. The inner end of the knife or blade is provided with an upstanding portion or flange 8 having three bolt holes 9 to receive bolts 10, which also pass through the central bolt hole and the end elongated holes of each runner, with their ends provided with nuts. By this arrangement the knives are adjustably secured to the runners. To adjust the knives the bolts of the end holes may be loosened, and the knives arranged as desired, the upstanding flange portion swinging upon the central bolt as a pivot, and then by tightening the nuts on the bolts, the knives may be secured firmly in position.

It will be observed that by the manner in which the knives are arranged and constructed, their planes always remain substantially at an obtuse angle to the disks 2 of the cultivator. In one of the figures of the drawings the rear portion or heel of one of the blades is provided with downwardly extending spurs or points 11, which act to harrow the soil.

By virtue of the adjustability of the knives, they may be so arranged as to travel substantially upon the surface of the soil or arranged to travel under the soil.

From the foregoing it is apparent that there have been devised simple and efficient cutting knives applicable to disk cultivators, and such as have been found practical and desirable owing to the fact that they thoroughly undermine the weeds and the like and agitate the soil.

The invention having been set forth, what is claimed as new and useful is:—

The combination with a cultivator having horizontally disposed runners, of a pair of knives arranged adjustably on the sides of the runners, said knives comprising upstanding flange portions, each being pivoted to the outer face of a runner, means coöperating with each flange and each runner upon each side of the pivot of said flange for holding the knives in adjusted positions, blades extending laterally and horizontally from said flanges and provided with cutting edges extending at slight acute angles to the plane of the rear portions of the runners, each of said blades having an additional cutting edge at its outer portion extending at an obtuse angle to the first cutting edge and at an acute angle to the rear of each runner, and downwardly extending spurs at the outer portion of each blade adjacent the termination of each second cutting edge.

In testimony whereof I have signed my name to this specification in the presence of two subscribing witnesses.

BENJAMIN H. WHIPPLE.

Witnesses:
Thomas E. Whipple,
Loyd R. Whipple.